United States Patent
Nowak et al.

(10) Patent No.: US 8,726,599 B2
(45) Date of Patent: May 20, 2014

(54) FATIGUE LOAD RESISTANT STRUCTURES AND WELDING PROCESSES

(75) Inventors: Daniel Anthony Nowak, Greenville, SC (US); Srikanth Chandrudy Kottilingam, Greenville, SC (US); Bill Damon Johnston, Greenville, SC (US)

(73) Assignee: General Electric Company, Schenectady, NY (US)

( * ) Notice: Subject to any disclaimer, the term of this patent is extended or adjusted under 35 U.S.C. 154(b) by 1074 days.

(21) Appl. No.: 12/651,729

(22) Filed: Jan. 4, 2010

(65) Prior Publication Data

US 2011/0164989 A1 Jul. 7, 2011

(51) Int. Cl.
*E02D 37/00* (2006.01)

(52) U.S. Cl.
USPC ............... 52/514; 52/276; 403/270; 403/205; 403/231

(58) Field of Classification Search
USPC ......... 52/276, 514; 228/262.3, 262.4, 262.41; 403/270, 271, 272, 205, 231; 428/686, 428/679; 416/DIG. 6
See application file for complete search history.

(56) References Cited

U.S. PATENT DOCUMENTS

| | | | | |
|---|---|---|---|---|
| 2,146,332 A | * | 2/1939 | Deming | 403/231 |
| 2,146,333 A | * | 2/1939 | Deming | 403/231 |
| 2,382,584 A | * | 8/1945 | Scheyer | 403/2 |
| RE22,905 E | * | 8/1947 | Scheyer | 403/2 |
| 2,729,184 A | * | 1/1956 | Bagsar | 114/79 R |
| 3,003,601 A | * | 10/1961 | Ott | 403/270 |
| 3,171,944 A | * | 3/1965 | Linnander | 219/137 R |
| 3,464,103 A | * | 9/1969 | Harris | 228/119 |
| 3,839,835 A | * | 10/1974 | Meyer | 52/296 |
| 3,882,654 A | * | 5/1975 | Yancey | 403/271 |
| 4,074,947 A | * | 2/1978 | Matake et al. | 403/231 |
| 4,075,392 A | * | 2/1978 | Jaeger | 428/457 |
| 4,168,183 A | * | 9/1979 | Greenfield et al. | 148/518 |
| 4,168,922 A | * | 9/1979 | Worrallo | 403/231 |
| 5,964,964 A | * | 10/1999 | Kurebayashi et al. | 148/320 |
| 6,336,583 B1 | * | 1/2002 | Wang et al. | 228/175 |
| 6,427,393 B1 | * | 8/2002 | Chen et al. | 52/167.1 |
| 6,544,668 B1 | * | 4/2003 | Santella et al. | 428/680 |
| 7,628,869 B2 | * | 12/2009 | Martin et al. | 148/320 |
| 8,056,297 B2 | * | 11/2011 | Mathai et al. | 52/651.01 |
| 2003/0108767 A1 | * | 6/2003 | Feng et al. | 428/680 |
| 2007/0122601 A1 | * | 5/2007 | Martin et al. | 428/220 |
| 2008/0078081 A1 | * | 4/2008 | Huff et al. | 29/890.124 |
| 2009/0155623 A1 | * | 6/2009 | Ayer et al. | 428/680 |
| 2010/0038076 A1 | * | 2/2010 | Spray et al. | 166/207 |
| 2011/0195269 A1 | * | 8/2011 | Minisandram | 428/615 |
| 2012/0214019 A1 | * | 8/2012 | Lin et al. | 428/615 |

FOREIGN PATENT DOCUMENTS

| | | | | |
|---|---|---|---|---|
| DE | 3741655 A1 | * | 6/1989 | B23K 33/00 |
| JP | 53137045 A | * | 11/1978 | B23K 31/00 |
| JP | 53147643 A | * | 12/1978 | B23K 33/00 |

* cited by examiner

*Primary Examiner* — Joshua J Michener
*Assistant Examiner* — Matthew Gitlin
(74) *Attorney, Agent, or Firm* — McNees Wallace & Nurick LLC

(57) ABSTRACT

A fatigue load resistant structure includes a fatigue loaded portion and a weldable fatigue loading resistant feature. The fatigue loaded portion includes a first elongation material. The weldable fatigue loading resistant feature includes a second elongation material secured to the fatigue loaded portion of the fatigue loaded structure. The first elongation material is less ductile than the second elongation material, and the weldable fatigue loading resistant feature can reduce, retard, or eliminate formation of cracks due to tensile and compressive forces.

10 Claims, 3 Drawing Sheets

FATIGUE LOAD RESISTANT STRUCTURES AND WELDING PROCESSES

FIELD OF THE INVENTION

The present disclosure generally relates to weld structures and welding processes. In particular, the present disclosure relates to welded structures including high elongation material to reduce, retard, or eliminate the formation of cracks due to tensile and/or compressive forces from fatigue loading.

BACKGROUND OF THE INVENTION

Structures and articles are continuously being designed and produced to be larger, to be more complex, and to have increased strength. One such structure is a wind turbine. Wind turbines can include a plurality of blades rotationally coupled to a generator rotor through a hub. The generator rotor can be mounted within a housing or nacelle, which may be positioned on top of a tubular tower or a base. The housing or nacelle has significant mass which is fatigue loaded on the tower or base. Movement of the housing due to wind or other forces may result in loads such as reversing fatigue loads on the tower or base or on the nacelle or the housing.

Fatigue loaded structures or portions of structures may be subjected to numerous physical forces. Physical forces may result from factors including, but not limited to, environmental effects (such as sunlight being on only a portion of the structure at a time), operational effects, and/or exposure to changing conditions. For example, a wind turbine tower can sway due to changes in wind speed thereby creating tension and compression on the metal making up the tower. The nacelle may be exposed to similar forces from the rotation of the blades. Likewise, a generator housing or other portions of the wind turbine can be subjected to these and other forces. Over time, the tensile and compressive forces can form cracks. Upon being formed, the cracks can propagate with continued cycling of tensile and compressive forces. Ultimately, the cracks can lead to failure of the structure.

Often, weld points are one of the weaker parts of such structures. Generally, welds secure two metal portions together. For example, a first metal portion may be secured to a second metal portion thereby forming a desired structure, article, or part of the structure or the article. Welds can be formed by partially melting workpieces and optionally adding the filler material that cools to become a joint (the weld). Generally, energy is provided to partially melt the metal portions and/or an optional filler material that secures the metal portions. The energy can be provided by a gas flame, an electric arc, a laser, an electron beam, friction, ultrasound, or other suitable sources of energy.

The filler material used in the weld can affect the resistance to fatigue loading. The American Welding Society has promulgated design and fabrication Reference Standard AASHTO/AWS D1.5M/D1.5 "Bridge Welding Code" (Standard D1.5) for fatigue loaded structures. Standard D1.5 specifies the qualification, fabrication, and inspection requirements applicable to highway bridges. The specification is used as a basis for most carbon and low alloy steel fatigue loaded structures. Welds formed by carbon and low alloy steels can crack upon fatigues loading, depending on the amount of strain, number of cycles and the environment they are in. To remedy the cracking, frames and/or other suitable articles can be fastened to cracked structures. The frames and/or other suitable articles can be expensive and/or take substantial time to install. Furthermore, the frames and/or other suitable articles can still be susceptible to failure after being formed in compliance with standard D1.5, due to excessive loading conditions.

BRIEF DESCRIPTION OF THE INVENTION

An exemplary embodiment includes a fatigue load resistant structure including a fatigue loaded portion and a weldable fatigue loading resistant feature. The fatigue loaded portion includes a first elongation material. The weldable fatigue loading resistant feature includes a second elongation material secured to the fatigue loaded portion of the fatigue loaded structure. In the embodiment, the first elongation material is less ductile than the second elongation material, and the weldable fatigue loading resistant feature reduces, retards, or eliminates formation of cracks due to tensile and compressive forces.

Another exemplary embodiment includes a welding process for welding a fatigue load resistant structure including identifying a fatigue loaded portion of the fatigue loaded structure and selecting the weldable fatigue loading resistant feature. The fatigue loaded portion includes a first elongation material. The weldable fatigue loading resistant feature includes a second elongation material. The first elongation material is less ductile than the second elongation material. In the embodiment, securing the weldable fatigue loading resistant feature to the fatigue loaded portion of the fatigue loaded structure reduces, retards, or eliminates formation of cracks due to tensile and compressive forces.

Another exemplary embodiment includes a fatigue load resistant structure including a fatigue loaded portion of the fatigue loaded structure and a weldable fatigue loading resistant feature. The fatigue loaded portion includes a first elongation material. The weldable fatigue loading resistant feature includes a second elongation material secured to the fatigue loaded portion of the fatigue loaded structure. In the embodiment, the first elongation material is less ductile than the second elongation material. The first elongation material is a low alloy steel or carbon steel. The second elongation material is a nickel-based alloy. Also, the weldable fatigue loading resistant feature reduces, retards, or eliminates formation of cracks due to tensile and compressive forces.

BRIEF DESCRIPTION OF THE DRAWINGS

Wherever possible, the same reference numbers will be used throughout the drawings to represent the same parts.

DETAILED DESCRIPTION OF THE INVENTION

Provided is a mechanism for reducing, retarding, and/or eliminating cracks and the propagation of cracks in fatigue loaded structures to form a fatigue load resistant structure. Embodiments of the present disclosure include improved resistance to structural failure, prolonged life for structures, and/or increased elongation for fatigue loaded portions of fatigue loaded structures.

Figure 1:
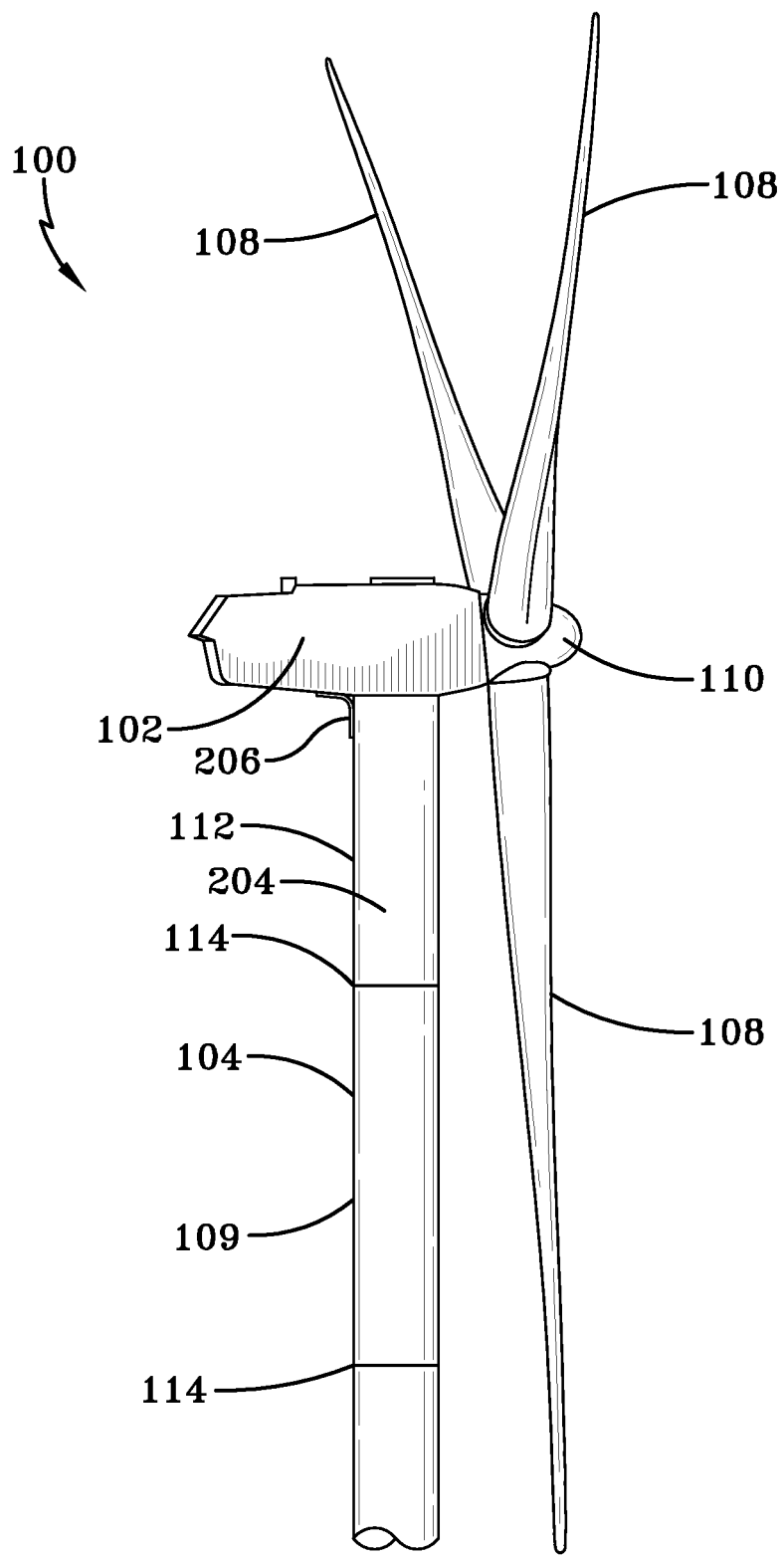
FIG. 1 shows a perspective view of a fatigue loaded wind turbine according to an exemplary embodiment.

FIG. 1 shows an exemplary fatigue loaded structure being a wind turbine system 100. Wind turbine system 100 generally comprises a nacelle 102 housing a generator (not shown). Nacelle 102 can be a housing mounted atop a tower 104. Tower 104 can include a first portion 109 and a second portion 112 welded or bolted together at joint 114. In one embodiment, the tower may further include another bolted joint securing second portion 112 to nacelle 102 and allowing nacelle 102 to rotate. In addition, tower can further include another weld securing second portion 112 to nacelle 102. Wind turbine system 100 can be installed on various types of terrain providing access to areas having desirable wind conditions. The terrain may vary greatly and may include, but is not limited to, mountainous terrain or off-shore locations. Wind turbine system 100 can also include one or more rotor blades 108 attached to a rotating hub 110. System 100 can include the generator for converting rotation of rotor blades 108 into electrical power.

Wind turbine system 100 can include portions subjected to increased fatigue loading. For example, tower 104 can have increased fatigue loading due to physical forces, such as wind or an unequal distribution of sunlight, causing tower to sway resulting in tension and/or compression of metal within tower 104. Similarly, nacelle 102 and/or other parts of wind turbine system 100 can have increased fatigue loading.

Figure 2:
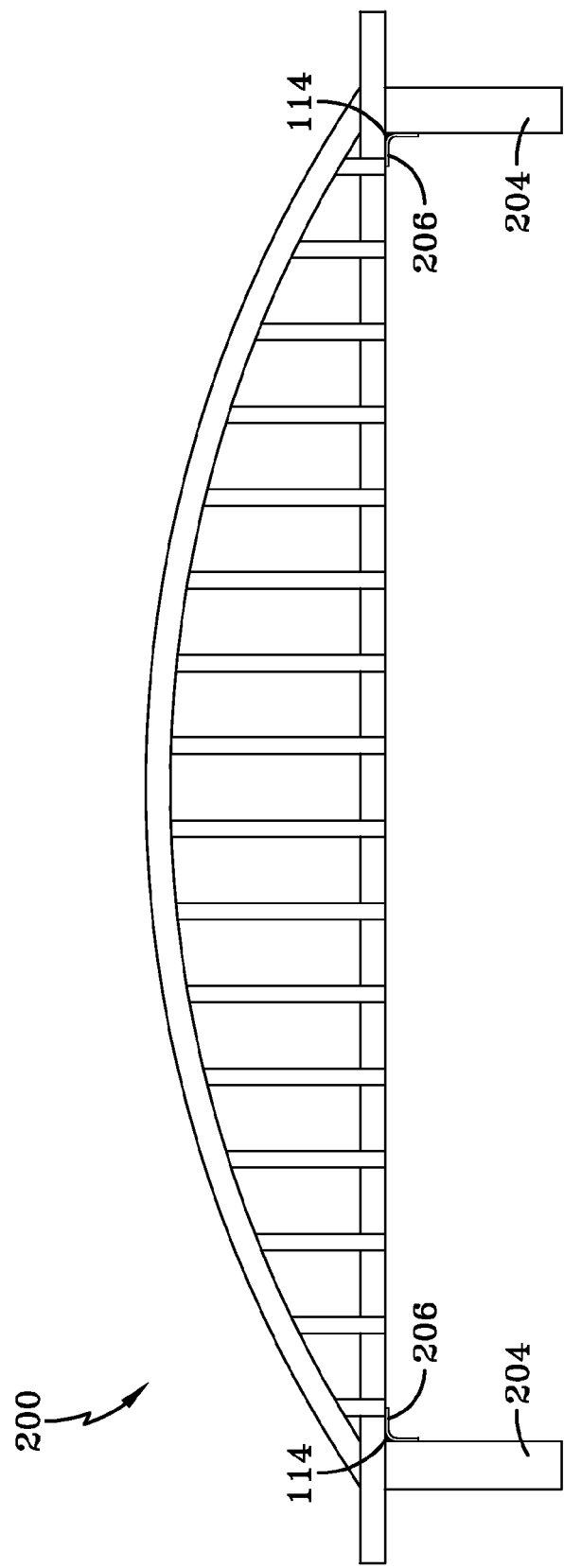
FIG. 2 shows a perspective view of a fatigue loaded bridge according to another exemplary embodiment.

FIG. 2 shows an exemplary fatigue loaded structure being a bridge 200. Similar to wind turbine system 100, bridge 200 includes several portions subjected to fatigue loading. These portions can be secured by welds at joint 114 at various places. Bridge 200 can be subjected to physical forces, such as wind and an unequal distribution of sunlight. In addition, bridge 200 can be subjected to additional forces provided from water, such as current, tide, and/or temperature variations from the water.

Other suitable fatigue loaded structures may be subjected to physical forces resulting in tension and/or compression of metal within the other suitable fatigue loaded structures. For example, buildings, railways, boats, automobiles, ocean platforms, and other suitable structures or portions of such structures may be subjected to physical forces resulting in tension and/or compression of metal within the structures.

Figure 3:
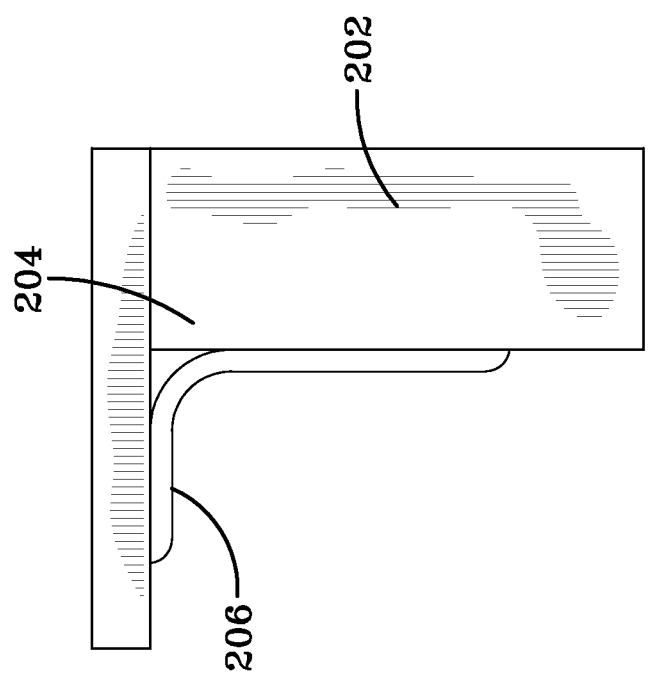
FIG. 3 shows a schematic view of a welded structure according to an exemplary embodiment.

Referring to FIG. 3, in an exemplary embodiment, the fatigue loaded structure includes a lower elongation material. Lower elongation material can be a low alloy steel or carbon steel. In one embodiment, the lower elongation material has a ductility that permits elongation at ambient temperature at about 15% to about 20%. In one embodiment, the lower elongation material remains elastically loaded at a yield strength ranging from about 45 ksi to about 60 ksi.

To reduce, retard, and/or eliminate the formation of cracks and/or the propagation of cracks, the fatigue loaded structure may include a weldable fatigue loading resistant feature 206 including a higher elongation material. Weldable fatigue loading resistant feature 206 is welded to the fatigue loaded structure at a point of likely high fatigue loading. Weldable fatigue loading resistant feature 206 can reduce, retard, and/or eliminate formation of cracks and/or propagation of cracks due to tensile and compressive forces. Although not intending to be bound by theory, it is believed that such distribution of tensile and compressive forces can further reduce and/or retard crack propagation by blunting of a tip of a crack. For example, nickel-based alloys can permit fatigue loaded portion 204 to sustain more cycles of tensile and compressive forces because the tip of the crack will not sharpen as fast as the lower elongation material. Weldable fatigue loading resistant feature 206 can increase the life of the fatigue loaded structure. For example, weldable fatigue loading resistant feature 206 can increase the number of fatigue cycles prior to crack initiation by having increased elongation. Additionally or alternatively, weldable fatigue loading resistant feature 206 can reduce, retard, and/or eliminate crack propagation by having increased elongation. By including weldable fatigue loading resistant feature 206, the life of the fatigue loaded structure can be extended by about 4 times to about 25 times.

The fatigue loaded structure may be subjected to an alternating load subjecting the fatigue loaded structure to cycles of tensile and compressive force. Weldable fatigue loading resistant feature 206 can go beyond the yield point where feature 206 will plastically deform. Thus, upon further cyclic loading, feature 206 will reduce the tensile portion of the load and increase the compressive portion of the load. As a result, an insignificant tensile fatigue load will be acting upon the structure. Repetition of the cycle can result in the fatigue loaded structure being subjected to one-half of the tensile and compressive forces that would exist without weldable fatigue loading resistant feature 206 being welded to the fatigue loaded structure.

The higher elongation material can be a nickel-based alloy, a cobalt-based alloy, an iron-nickel based alloy or other suitable alloy. For example, a relatively ductile metal can be utilized as the higher elongation material. In one embodiment, the higher elongation material has a ductility that permits elongation at room temperature at about 45% to about 60%. In one embodiment, the higher elongation material remains elastically loaded at a yield strength ranging from about 40 ksi to about 50 ksi.

The physical conditions, including but not limited to temperature, can be considered in determining the amount of the higher elongation material in weldable fatigue loading resistant feature 206. For example, in conditions where it is desirable to include greater ductility and/or yield strength, a greater amount of the higher elongation material may be included in weldable fatigue loading resistant feature 206. In conditions where greater ductility and/or yield strength are insignificant, then a lower amount of the higher elongation material may be included in weldable fatigue loading resistant feature 206. The lower amount of the higher elongation material may be included in weldable fatigue loading resistant feature 206 for reducing the cost of the fatigue loaded structure and/or so that other benefits associated with other materials may be achieved.

Figure 4:
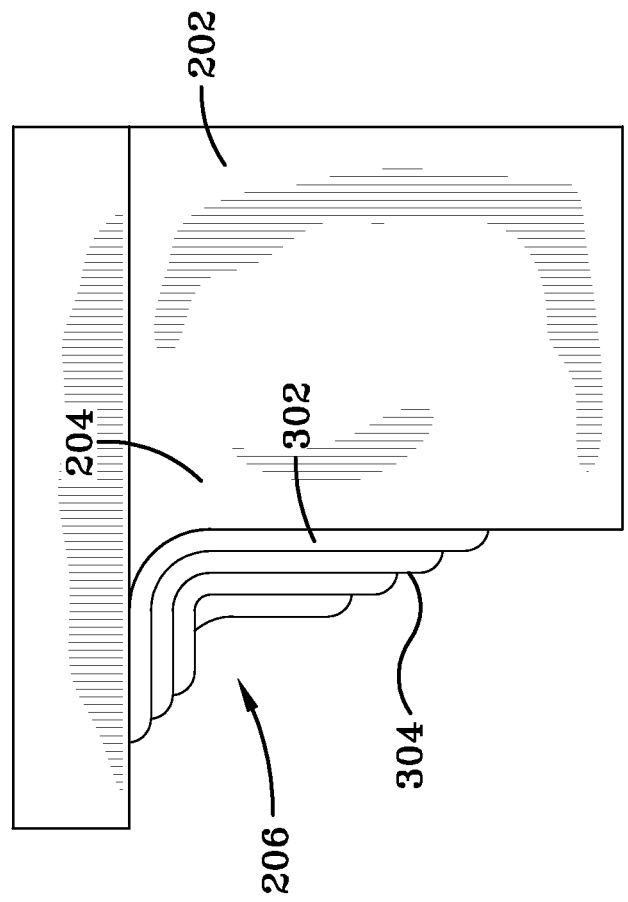
FIG. 4 shows a schematic view of a welded structure including one or more fillets according to an exemplary embodiment.

Referring to FIG. 4, weldable fatigue loading resistant feature 206 can be formed in whole or in part by a fillet 302. Fillet 302 can cap the fatigue loaded structure thereby reducing, retarding, and/or eliminating the formation of cracks in the fatigue loaded structure. Fillets 302 can be any suitable shape including, but not limited to, a gusset and/or a doubler plate. One or more additional fillets 304 can be stacked on fillet 302. Additional fillets 304 can be designed to distribute forces from or on fatigue loaded structure. For example, additional fillets 304 may be of a smaller size than fillet 302. In another exemplary embodiment, weldable fatigue loading resistant feature 206 is formed by a weld filler. The weld filler can form weld at joint 114. The weld filler can be used additional or alternative to fillet 302. Fillets 302 can be welded with the lower elongation material and/or the higher elongation material at varying concentrations.

An exemplary welding process for welding the fatigue loaded structure can include identifying a portion of the fatigue loaded structure and welding weldable fatigue loading resistant feature 206 to the fatigue loaded structure thereby reducing, retarding, and/or eliminating formation of cracks due to tensile and compressive forces. In one embodiment, weldable fatigue loading resistant feature 206 is the fillet 302. In another embodiment, weldable fatigue loading resistant feature 206 is the filler. In yet another embodiment, weldable fatigue loading resistant feature is the fillet 302 and the filler. Additionally, an embodiment of the welding process can include identifying an additional portion of the fatigue loaded structure and welding weldable fatigue loading resistant feature 206 to the additional portion. Welding weldable fatigue loading resistant feature 206 to the additional portion can permit further reduction and/or retardation of the formation and/or propagation of cracks.

Generally, the fatigue loaded structure can be operated at ambient and/or room temperature. At high temperatures (for example, a temperature of about 1000° F. or 538° C.), the elongation of the materials will increase and the yield strength will decrease. Increased elongation may have a reduced effect on preventing the formation and/or propagation of cracks within fatigue loaded structure because the strength may be too low. At low temperatures (for example, a temperature of about 32° F. or 0° C.), the elongation will decrease and the yield strength will increase. Increased elongation may have a greater effect on preventing the formation and/or propagation of cracks within the fatigue loaded structure at lower temperatures because the strength will not be too low. Thus, the benefit of including the higher elongation material in weldable fatigue loading resistant feature 206 may be greater as the temperature decreases. As such, including the higher elongation material in weldable fatigue loading resistant feature 206 may differently affect operation of the fatigue loaded structure at a range of about −20° F. or −29° C. to about 70° F. or 21° C., at a range of about 32° F. or 0° C. to about 100° F. or 38° C., at a range of about 60° F. or 16° C. to about 120° F. or 49° C., at a range above about 100° F. or 38° C., at a range above about 1000° F. or 538° C.

The amount, composition, and arrangement of the higher elongation material in weldable fatigue loading resistant feature 206 may correspond to an operating temperature of the fatigue loaded structures. For example, at cold temperatures, the amount of the higher elongation material in weldable fatigue loading resistant feature 206 may be lower, the amount of nickel-alloy in composition of the higher elongation material in weldable fatigue loading resistant feature 206 may be lower, and/or the arrangement of the higher elongation material in weldable fatigue loading resistant feature 206 may have a smaller surface area. At higher temperatures, the amount of the higher elongation material weldable fatigue loading resistant feature 206 may be higher. For example, at high temperatures, the amount of the higher elongation material in weldable fatigue loading resistant feature 206 may be higher, the amount of nickel-alloy in a composition of the higher elongation material in weldable fatigue loading resistant feature 206 may be higher, and/or the arrangement of the higher elongation material in weldable fatigue loading resistant feature 206 may have a larger surface area.

While the disclosure has been described with reference to a preferred embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. A fatigue load resistant structure, the structure comprising:
   a fatigue loaded portion of the fatigue loaded structure, the fatigue loaded portion comprising a first elongation material; and
   a weldable fatigue loading resistant feature comprising a second elongation material secured to the fatigue loaded portion of the fatigue loaded structure; and,
   wherein the first elongation material is less ductile than the second elongation material, and the second elongation material remains elastically loaded at a yield strength ranging from about 40 ksi to about 50 ksi;
   wherein the weldable fatigue loading resistant feature reduces, retards, or eliminates formation of cracks due to tensile and compressive forces;
   wherein the fatigue loaded structure is a wind turbine and the weldable fatigue loading resistant feature is positioned between a wind turbine tower and a wind turbine nacelle.

2. The structure of claim 1, wherein the first elongation material is a low alloy steel or carbon steel.

3. The structure of claim 1, wherein the second elongation material is a nickel-based alloy.

4. The structure of claim 1, wherein the second elongation material has a ductility permitting elongation of about 45% to about 60%.

5. The structure of claim 1, wherein the first elongation material has a ductility permitting elongation of about 15% to about 20%.

6. The structure of claim 1, wherein the second elongation material is formed by a weld filler.

7. The structure of claim 1, wherein the second elongation material is formed by a fillet.

8. A fatigue load resistant structure, the structure comprising:
   a fatigue loaded portion of the fatigue loaded structure, the fatigue loaded portion comprising a first elongation material; and
   a weldable fatigue loading resistant feature comprising a second elongation material secured to the fatigue loaded portion of the fatigue loaded structure; and,
   wherein the first elongation material is less ductile than the second elongation material,
   wherein the first elongation material is a low alloy steel or carbon steel,
   wherein the second elongation material is a nickel-based alloy, and
   wherein the weldable fatigue loading resistant feature reduces, retards, or eliminates formation of cracks due to tensile and compressive forces;
   wherein the fatigue loaded structure is a wind turbine and the weldable fatigue loading resistant feature is positioned between a wind turbine tower and a wind turbine nacelle.

9. The structure of claim 8, wherein the nickel-based alloy is formed by a weld filler, a fillet, or a combination thereof.

10. The structure of claim 8, wherein the fatigue load resistant structure is a wind turbine and the fatigue loaded portion is selected from the group consisting of a wind turbine tower, a wind turbine nacelle, and combinations thereof.

* * * * *